INVENTOR:

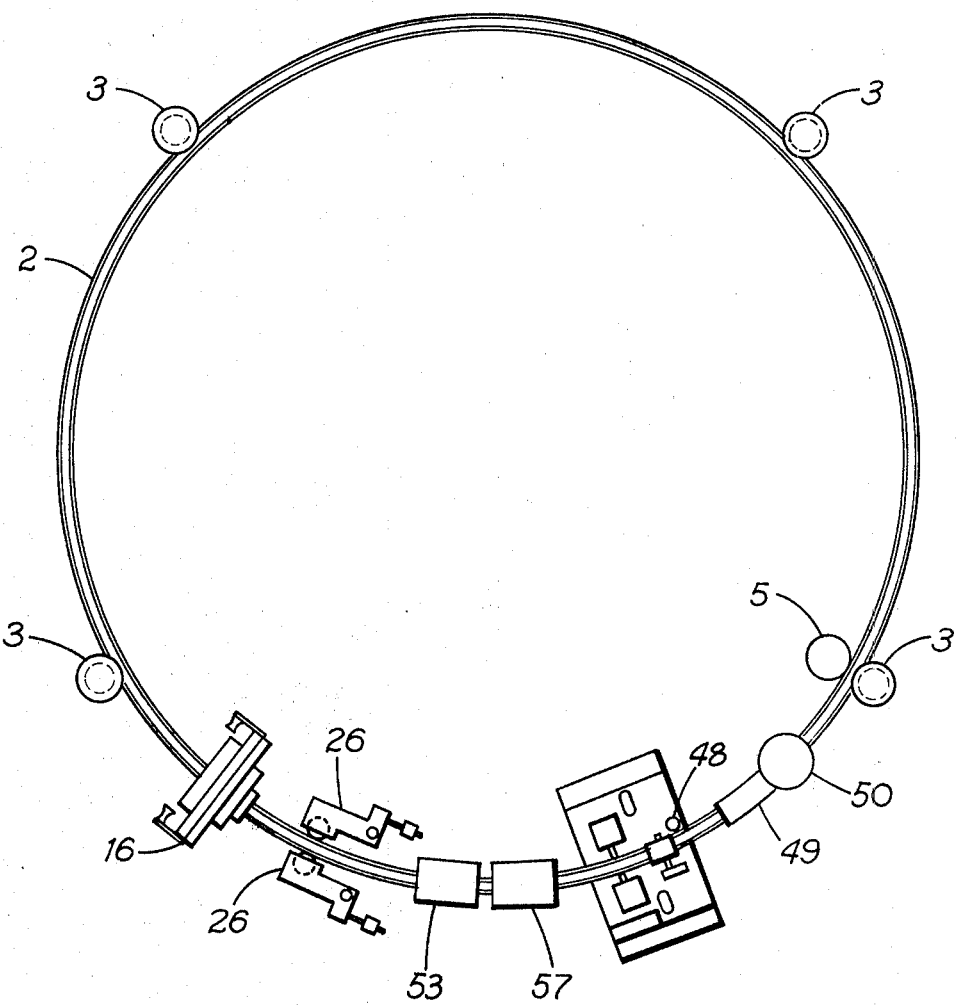

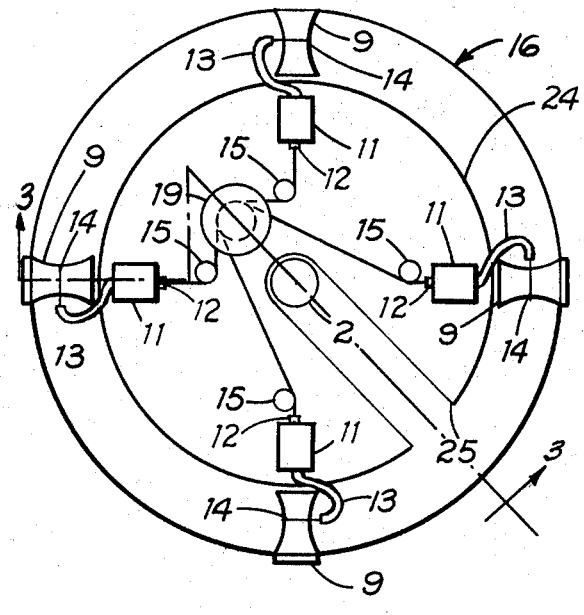
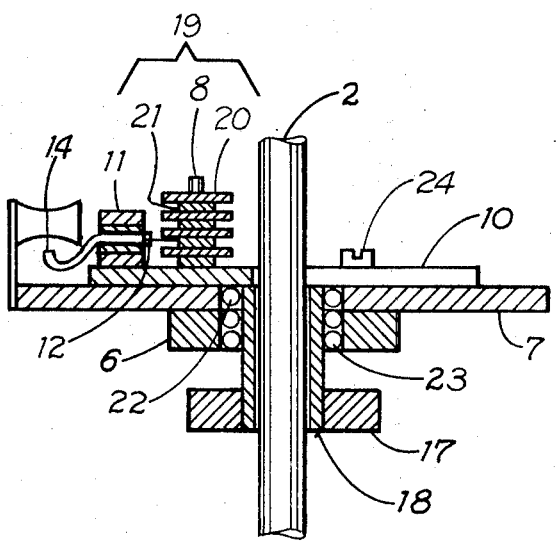
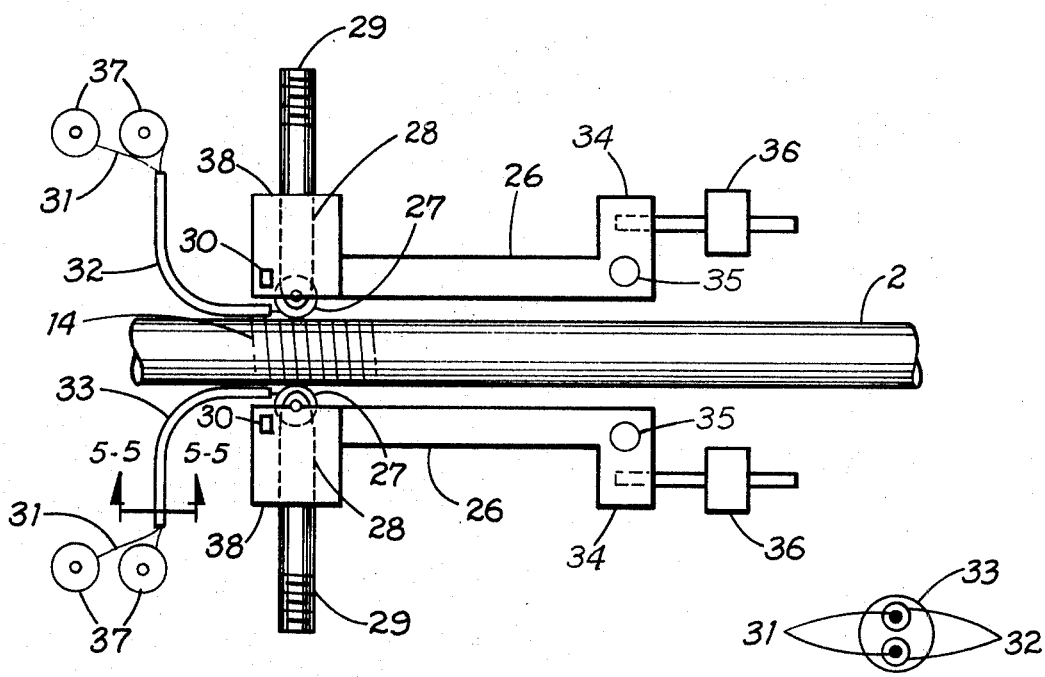

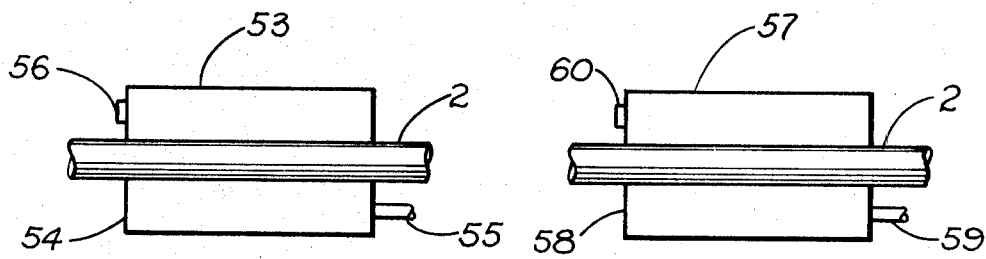
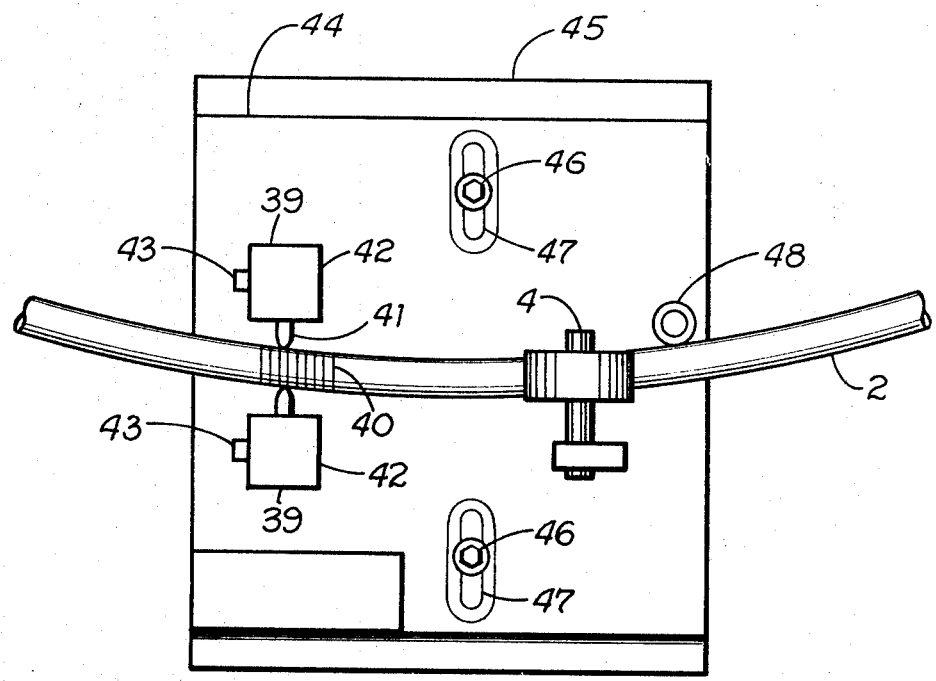

United States Patent Office 3,518,150
Patented June 30, 1970

3,518,150
DEVICES FOR BONDING THERMOPLASTIC
FILAMENTS
Sol L. Giles, Monrovia, Calif., and Philip G. Patch, 18084
Sandy Cape Drive, Pacific Palisades, Calif. 90272;
said Giles assignor to said Patch
Filed Sept. 27, 1966, Ser. No. 583,137
Int. Cl. B65h *81/00*
U.S. Cl. 156—426                                    9 Claims

ABSTRACT OF THE DISCLOSURE

An apparatus producing thermoplastic strips of bonded material suitable for use as artificial eyelashes or the like comprised of a driven mandrel ring adapted during its movement to receive weft and warp filaments and move the same through a sequential bonding, curing, cutting, stripping and collecting operation, whereafter the individual strips can be cut widthwise to provide smaller usable strips.

---

This invention relates to a device for continuously assembling and thermally bonding thermoplastic filaments in material comprising pairs of warp strands thermoplastically bonded to a plurality of weft strands and suitable for making artificial eyelashes and the like.

In one form of the invention thermoplastic filaments are continuously fed onto and wound about the tube of a ring mandrel as the mandrel is rotated about its center and through a centrally positioned passage of a filament winding assembly, the filaments thus wound appearing on the mandrel as a succession of regularly spaced and parallel weft strands. Two pairs of warp filaments, the strands of each pair being closely aligned and parallel, and with the pairs disposed above and diametrally below the mandrel, are then fed to and laid crosswise upon the previously wound weft filaments and thermally bonded thereto with pressure from heated rollers. The continuous rotation of the mandrel ring carries the bonded material through a heated zone where the filaments are cured by thermoplastic unstressing and then through a zone where they are cooled and set. Following the cooling operation, two thermal cutters, one positioned above and the other diametrally below the mandrel ring divide the bonded material in two lengthwise strips. Each of these two strips is then peeled away from the mandrel on opposite sides and wound upon separate spools.

In the drawings forming part of the description of the present invention

FIG. 1 is an elevated view of the device with the various assemblies thereof,

FIG. 2 is a transverse view of the filament winder,

FIG. 3 is a sectional view on the line 3—3 of FIG. 2,

FIG. 4 is an elevated view of the two filament bonders,

FIG. 5 is a sectional view on the line 5—5 of FIG. 4,

FIG. 6 is a sectional view of the heater,

FIG. 7 is a sectional view of the cooler for cooling and setting bonded filaments, FIG. 8 is an elevated view of the two thermal cutters.

Figure 9:
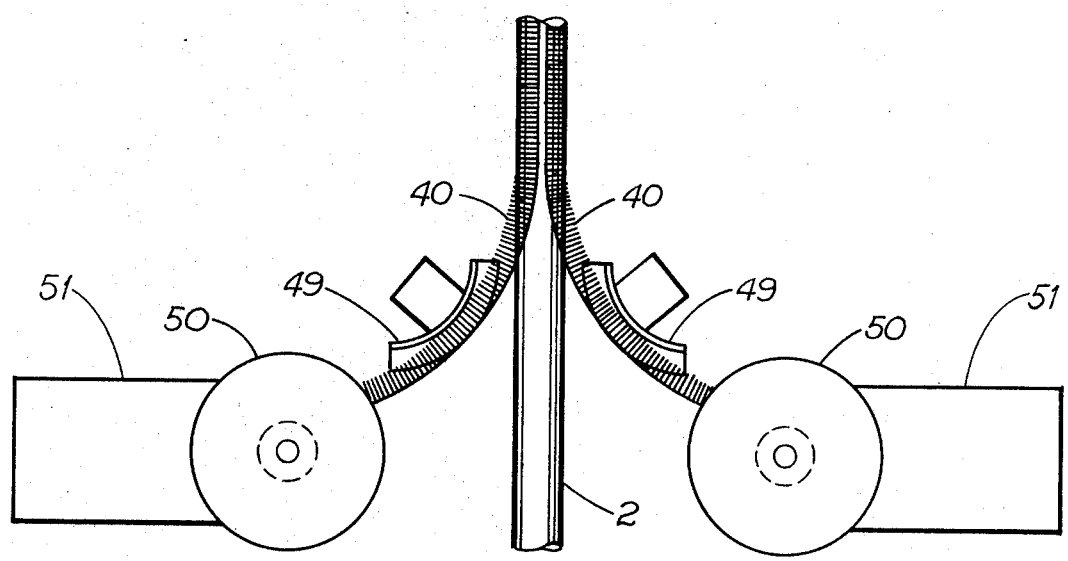
FIG. 9 is a plan view of the two strippers.

Referring to the drawings, the numeral 1 of FIG. 1 designates a preferred form of the device of this invention. A chief component of the device is a ring mandrel 2 designed to rotate in a vertical plane and upon which filamented material is assembled. The mandrel 2, preferably of tubular metal construction, is supported by horizontal rollers 3 and restrained in the vertical plane of rotation by the vertical rollers 4, and in operation is rotated at a relatively slow rate in a counter-clockwise direction about the mandrel center by the friction drive of a roller 3 powered by the motor 5, the conventional means for regulating the speed thereof not being shown.

A filament winder 16, shown in detail in FIG. 2, provided for winding thermoplastic filaments 14 about the mandrel 2, is mounted so as to rotate about a segment of the moving mandrel ring 2. The filament winder 16 consists of a circular base plate 7 with a centrally positioned annular bearing 22 and having fixed on one face a pulley 6 rotatably disposed with an annular bearing 23 on a hollow bearing shaft 18 fixed at one end in the bracket 17. The mandrel 2 is shown in FIG. 3 passing through the bore of the hollow shaft 18 and correspondingly disposed parts of the filament winder 16. Rotation of the filament winder 16 is effected by belt drive of the pulley 6 from a motor not shown. On the other face of the base plate 7 are mounted four fixed spools 9, wound with thermoplastic filaments 14, and a centrally positioned mounting plate 10 attached to the base plate 7 by screws 24 and with a radial slot 25 to permit assembly without dismantling the mandrel 2. Fixed to the mounting plate 10 are four pillow blocks 11, four bearing posts 15, and a filament spacer 19 for spacing at regular intervals the filaments 14 before they are wound about the mandrel 2. In a bearing in each of the pillow blocks 11 is rotatably mounted a hollow shaft 12 aligned radially on the mounting plate 10 with axis coincident with the central axis of an adjacent spool 9. Terminating at and fixed to the outer end of each hollow shaft 12 a tubular conduit 13 is curved about the near flange of the adjacent spool 9 with the free end of the conduit 13 rotatable about the spool 9 in position to unwind the filament 14 therefrom, for ducting filament 14 from the spool and through the hollow shaft 12 as the filament is being wound on the mandrel 2. The filament spacer 19, shown sectionally in FIG. 3, consists of a plurality of discs 20 separated by spacers 21 assembled on a center post 8. In the operation of the filament winder 16, filaments 14 stored on the fired spools 9 are threaded through each adjacent conduit 13 and the hollow shaft 12 in which the conduit is terminated; the filaments are then borne around the bearing posts 15, thence drawn separately between discs 20 of the filament spacer 19 and, finally, wound about the mandrel 2. Rotation of the filament winder 16 and consequent winding of the filament 14 upon the mandrel 2 causes the filament to be drawn through the conduit 13, and this results in a circular movement of the free end of the conduit and this forces the shaft 12 to which the conduit is attached to rotate, thereby continuously unwinding the filament 14 from the fixed spool 9.

Two filament bonders 26 provided for thermally bonding warp strands of filament are shown in the detailed elevated view FIG. 4. In each bonder assembly a bonding roller of heat-conducting material 27, designed to roll with pressure upon the moving mandrel 2, is mounted rotatably in bearings of a heat-conducting plug 28, the bonding roller and the plug both heated by conduction from an adjacent resistance heater 29, with the temperature of the bonding roller 27 conventionally controlled by the thermocouple 30. For laying two parallel warp strands of thermoplastic filament 31, shown in the sectional view FIG. 5 on the line 5—5 of FIG. 4, beneath the bonding roller 27 a pair of tubular conduits 32 enclosed in a tubular cooling jacket 33 are positioned with exit ends adjacent the point of contact of the bonding roller 27 and the mandrel 2. Each filament bonder 26 is mounted in a housing of dielectric and heat-resistant material 38 at one end of an arm 34 pivoted at 35 and having at the end remote from the filament bonder a counterbalance 36 variable in position so as to regulate pressure of the bonding roller 27 upon the mandrel 2. In operation, thermoplastic filaments 31 mounted upon rotatable spools 37 are threaded into the adjacent conduits 32 and thence between the heated bonded roller 27 and the weft strands 14 previously wound upon the mandrel 2, the combined pressure and heat of the roller 27 acting to bond the warp filaments to the weft filaments. A jet of air through the cooling jacket 33 from a source not shown prevents breakage or weakening of the warp filaments 31 from premature heating and plasticizing.

A heater 53, shown sectionally in FIG. 6, provided for thermally unstressing the bonded filament material after its passage through the filament bonders 26 consists of a housing having two openings 54 through which the mandrel ring 2 is rotated and which is heated by hot air supplied through line 55 from a source not shown and vented through the port 56.

A cooler 57, shown sectionally in FIG. 7, provided for cooling and setting the bonded filament material after its passage through the heater 53 consists of a housing having two openings 58 through which the mandrel 2 is rotated and which is cooled by air supplied through line 59 from a source not shown and vented through the port 60.

Two thermal cutters 39, shown in elevated detail in FIG. 8, are diametrally disposed above and below the mandrel 2 for dividing into two strips 40 the filament material bonded upon the mandrel 2 and carried to the cutters by mandrel rotation. Each cutter 39 consists of a looped resistance heating element 41 disposed in a housing 42 and circuited with a source of electric power not shown. The cutters 39 are mounted on brackets 43 fixed to an outer plate 44 positioned adjacent the mandrel 2 and parallel to the plane of mandrel rotation, the outer plate 44 being parallel to and slidably contacting an inner plate 45 fixed to the frame of the device 1 and having two flanged studs 46 perpendicular to its face slidably disposed in vertical slots 47 of the outer plate 44. The loops of the resistance heating element 41 are disposed between pairs of warp strands in close proximity to but nowhere touching the bonded filaments, so that the weft strands of material are plasticized and severed in a continuing line between the strands of each pair of warps without becoming fouled by contact with melted filament material. A weighted horizontal cam roller 48 with axle fixed to the outer plate 44 rolls atop a segment of the mandrel 2 after bonded material has been stripped therefrom, following the undulations and irregularities of the mandrel 2 as it rotates and causing a corresponding vertical movement of the outer plate 44 and the cutters 39 fixed thereto, thereby maintaining a constant clearance between the loops of the resistance heating elements 41 and the material being thermally cut.

Two strippers 49, shown in the plan view of FIG. 9, provided for peeling off from the mandrel 2 strips of bonded material 40 and guiding the strips onto rotatably driven winding spools 50 are fixed to a bracket 51 on opposite sides of the mandrel 2. Each stripper 49 is an elongate member of thin material arcuately disposed at one end about a segment of the mandrel 2 and in near contact therewith then guidably departing from the mandrel 2 in a horizontal curve. After being stripped from the mandrel 2 each strip of finished material 40 is guided to and wound onto a spool 50 rotatably driven by a motor of constant torque not shown.

Figure 10:
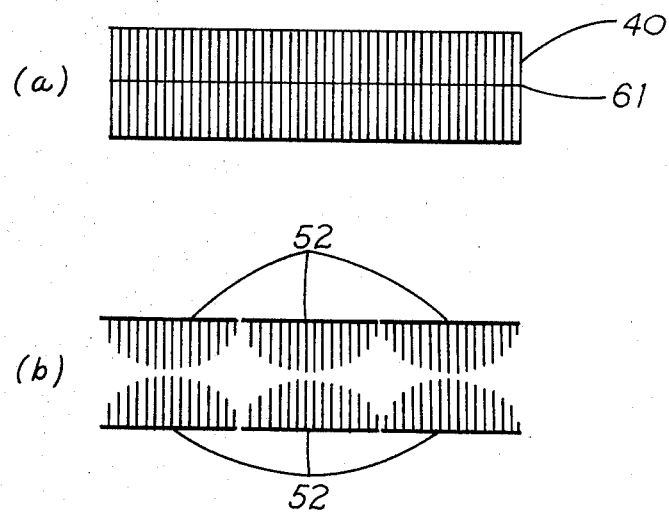
FIG. 10 is a plan view showing: (a) a strip of bonded material, and (b) the strip after cross-cutting and trimming.

The end products of the operations described in the foregoing paragraphs are two ladder-like strips of bonded material 40 as shown in (a) of FIG. 10. By lengthwise division of the strips on the line 61 and appropriate crosscutting and trimming as shown in (b) of FIG. 10, articles such as artificial eyelashes 52 may be produced with facility.

What is claimed:
1. A device for the continuous production of material suitable for making artificial eyelashes and the like which are composed of warp strands of thermoplastic filaments in pairs thermally bonded to weft strands, said device comprising a circular mandrel, roller means supporting and restraining said mandrel for rotation, power means connected to said mandrel for rotatably driving the same, means for winding thermoplastic filaments about the mandrel as weft strands during rotation of the mandrel, heated-roller and pressure means for thermally bonding thermoplastic warp strands to weft strands wound about the mandrel, means for thermally unstressing filament material bonded upon the mandrel, means for cooling and setting the unstressed material, cutter means for dividing the material into continuous strips, means for peeling the strips from the mandrel and winding them onto spools, said thermoplastic filament winding means including a filament supply means having mounting means fixed in relation to the rotation of the circular mandrel but rotatable about a segment of the mandrel, said supply means comprising a plate having fixed to one face a drive means and on its opposite face a plurality of peripherally disposed fixed spools, said spools being adapted to have thermoplastic filaments wound thereon for transfer to the mandrel during rotation, a mounting plate positioned on the base plate, individual bearing supports one for each spool disposed on said mounting plate, a hollow shaft rotatably supported by each of said supports and having an end positioned adjacent its respective spool whereby the same will rotate relative to the spool while unwinding filament therefrom for ducting filament into and through the hollow shaft as it is wound about the mandrel.

2. The device of claim 1 wherein the mounting plate has at least one radial slot adapted to receive the mandrel, and means for removably attaching the mounting plate to the base plate without dismantling the mandrel.

3. The device of claim 1 wherein the drive means includes a driven pulley, and the pulley and base plate are provided with aligned bearings rotatable about a hollow shaft having the rotating mandrel disposed therein whereby the pulley and base will rotate about a segment of the mandrel.

4. The device of claim 1 further including bearing posts equal in number to the filament supply spools fixed to the base plate, each for guiding a strand of thermoplastic filament to a filament spacer, and a filament spacer positioned adjacent the center of the mounting plate consisting of a plurality of discs, between adjoining members of which a filament may be passed, said discs being assembled on a center post and separated by spacers of lesser diameter, for separating filaments drawn around the bearing posts and spacing them equally apart as they are wound onto the mandrel.

5. A device for the continuous production of material suitable for making artificial eyelashes and the like which are composed of warp strands of thermoplastic filaments in pairs thermally bonded to weft strands, said device comprising a circular mandrel, roller means supporting and restraining said mandrel for rotation, power means connected to said mandrel for rotatably driving the same, means for winding thermoplastic filaments about the mandrel as weft strands during rotation of the mandrel, heated-roller and pressure means for thermally bonding thermoplastic warp strands to weft strands wound about the mandrel, means for thermally unstressing filament material bonded upon the mandrel, means for cooling and setting the unstressed material, cutter means for dividing the material into continuous strips, means for peeling the strips from the mandrel and winding them onto spools, said heated-roller and pressure means including at least two filament bonders, each for drawing by pressing upon the moving mandrel a pair of thermoplastic filaments, each filament bonder comprising a housing of dielectric and heat-resistant material in which a roller of heat-conducting material is rotatably mounted in a heat-conducting plug heated by a resistance heater connected to a source of electric power, thermocouple means for regulating temperature of the roller, each filament bonder being pivoted at one end of a pivoted arm and being provided at the end remote from the filament bonder with a counterbalance variable in distance from the pivot so as to regulate pressure of the roller upon the rotating mandrel and the material being bonded thereon.

6. The device of claim 5 where in each filament bonder a pair of conduits enclosed in a tubular cooling jacket are positioned with exit ends adjacent the point of contact of the roller and the mandrel, so that when a thermoplastic filament wound on the supply spool is threaded through each conduit and inserted between the roller and the moving mandrel, the two filaments are drawn from the spool and bonded as a pair of closely aligned strands of warp upon the weft strands wound about the mandrel, with means for circulating air through the cooling jacket and cooling the filaments to prevent plasticizing before being drawn into bonding position.

7. A device for the continuous production of material suitable for making artificial eyelashes and the like which are composed of warp strands of thermoplastic filaments in pairs thermally bonded to weft strands, said device comprising a circular mandrel, roller means supporting and restraining said mandrel for rotation, power means connected to said mandrel for rotatably driving the same, means for winding thermoplastic filaments about the mandrel as weft strands during rotation of the mandrel, heated-roller and pressure means for thermally bonding thermoplastic warp strands to weft strands wound about the mandrel, means for thermally unstressing filament material bonded upon the mandrel, means for cooling and setting the unstressed material, cutter means for dividing the material into continuous strips, means for peeling the strips from the mandrel and winding them onto spools, and at least two thermal cutters diametrically disposed above and below the mandrel for dividing the bonded material into at least two strips, each cutter consisting of a looped resistance heating element disposed in a housing of dielectric and heat-resistant material and circuited with a source of electric power, the cutters mounted on brackets extended from an outer plate adjacent the mandrel and parallel to the plane of mandrel rotation, the outer plate being parallel to and slidably contacting an inner plate fixed to the frame of the device and having a plurality of flanged studs perpendicular to its face slidably disposed in vertical slots of the outer plate, with the loops of the heater elements disposed between filaments of each pair of warp strands in proximity to but nowhere touching the filament material bonded upon the mandrel, so that as the bonded filament material is carried to the cutters the weft material thereof is thermally plasticized and parted in a continuing line between the strands of each pair of warps.

8. The device of claim 7 wherein a weighted horizontal cam roller with axle fixed in the outer plate is positioned so as to roll upon the mandrel after removal of the filament material bonded thereon, the roller following the irregularities and undulations of the mandrel moving beneath it and causing a corresponding vertical movement of the outer plate and the cutters fixed thereto, thereby maintaining a constant clearance between the heated cutter loops and the weft material being cut.

9. A device for the continuous production of material suitable for making artificial eyelashes and the like which are composed of warp strands of thermoplastic filaments in pairs thermally bonded to weft strands, said device comprising a circular mandrel, roller means supporting and restraining said mandrel for rotation, power means connected to said mandrel for rotatably driving the same, means for winding thermoplastic filaments about the mandrel as weft strands during rotation of the mandrel, heated-roller and pressure means for thermally bonding thermoplastic warp strands to weft strands wound about the mandrel, means for thermally unstressing filament material bonded upon the mandrel, means for cooling and setting the unstressed material, cutter means for dividing the material into continuous strips, means including at least two strippers for peeling the strips from the mandrel and winding them onto spools, each stripper comprising an elongate member of thin material arcuately disposed at one end upon a segment of the mandrel and in near contact therewith then guidably departing from the mandrel to a position to facilitate winding upon a spool the strip guided thereto, with constant-torque means for driving the winding spool.

References Cited

UNITED STATES PATENTS

| | | | |
|---|---|---|---|
| 1,274,910 | 8/1918 | Lister | 156—193 XR |
| 2,797,728 | 7/1957 | Slayter et al. | 156—431 XR |
| 3,095,338 | 6/1963 | Romanin | 156—181 XR |
| 3,245,852 | 4/1966 | Martin et al. | 156—498 XR |
| 3,360,412 | 12/1967 | James | 156—306 XR |
| 3,400,032 | 9/1968 | Sexstone | 156—498 XR |

HAROLD ANSHER, Primary Examiner

D. J. FRITSCH, Assistant Examiner

U.S. Cl. X.R.

156—429, 431, 433, 457, 497, 498, 499, 527